United States Patent [19]

Yamaguchi

[11] Patent Number: 5,634,024

[45] Date of Patent: May 27, 1997

[54] DEFINITION EXECUTION SYSTEM FOR OPERATIONS AND FUNCTIONS IN COMPUTER SYSTEM

[75] Inventor: Tomoharu Yamaguchi, Tokyo, Japan

[73] Assignee: NEC Corporation, Tokyo, Japan

[21] Appl. No.: 438,735

[22] Filed: May 10, 1995

[30] Foreign Application Priority Data

May 18, 1994 [JP] Japan ................................ 6-103653

[51] Int. Cl.$^6$ ........................................................ G06F 9/00
[52] U.S. Cl. ................................................................ 395/376
[58] Field of Search ...................... 395/DIG. 1 MS File, 395/DIG. 2 MS File, 375, 155, 159, 161, 376

[56] References Cited

U.S. PATENT DOCUMENTS

| | | | |
|---|---|---|---|
| 5,398,313 | 3/1995 | Kojima et al. | 395/159 |
| 5,546,519 | 8/1996 | Berry | 395/155 |
| 5,566,294 | 10/1996 | Kojima et al. | 395/159 |

FOREIGN PATENT DOCUMENTS 6-195392  7/1994  Japan .

OTHER PUBLICATIONS

M. Kado et al., "A Model for Visual Programming Systems", Information Processing Society of Japan, Seminar Report 91-SE-78-3, 1991, pp. 21-28.

Primary Examiner—Robert B. Harrell
Attorney, Agent, or Firm—Foley & Lardner

[57] ABSTRACT

A definition execution system for operation and function in a computer system uses a user operation portion to accept an operation by a user with respect to an application program, and a descriptive sentence input portion to input a descriptive sentence written in a natural language to represent a function corresponding to the operation. A descriptive sentence interpretation portion interprets the descriptive sentence to output a function instruction for realizing the function contained in the descriptive sentence represented in a program language of the application program. A corresponding definition portion associates the operation and the function instruction to output corresponding information which indicates a corresponding relation between the operation and the function instruction and to store in a corresponding storage portion. A conversion portion enters the operation received by the user operation portion to select the function instruction corresponding to the operation according to corresponding information stored in the corresponding storage portion, and a function execution portion executes the function according to the function instruction selected.

14 Claims, 9 Drawing Sheets

FIG.2

OPERATION-OPERATION INFORMATION CORRESPONDING TABLE 110

| OPERATION | OPERATION INFORMATION |
|---|---|
| (SELECTION OF ICON #1) | SELECT ICON #1 |
| (MOVEMENT OF ICON #3) | MOVE ICON #3 |
| (OVERLAPPING OF ICONS #2 AND #4) | OVERLAP ICON #2 #4) |
| ⋮ | ⋮ |

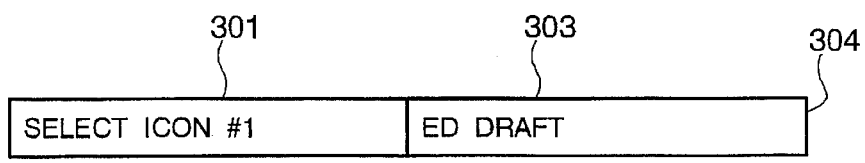

301    303    304

| SELECT ICON #1 | ED DRAFT | |

FIG.4

CORRESPONDING STORAGE PORTION 105

| OPERATION INFORMATION | FUNCTION DEFINITION |
|---|---|
| MOVE ICON #3 | COPY CURRENT FILE |
| SELECT ICON #1 | ED DRAFT |
| OVERLAP ICON #2 #4) | CALC INFILE OUTFILE BALANCE REPORT BALANCE |
| ⋮ | ⋮ |

| 901 | 902 | 905 |
|---|---|---|
| SELECT ICON #1 | DRAWS UP THE DOCUMENT | |

FIG.10

806 CORRESPONDING STORAGE PORTION

| OPERATION INFORMATION | FUNCTION DEFINITION |
|---|---|
| MOVE ICON #3 | COPIES THE CURRENT FILE |
| SELECT ICON #1 | DRAWS UP THE DOCUMENT |
| OVERLAP ICON #2 #4) | SETTLES THE ACCOUNTS |
| ⋮ | ⋮ |

901 902

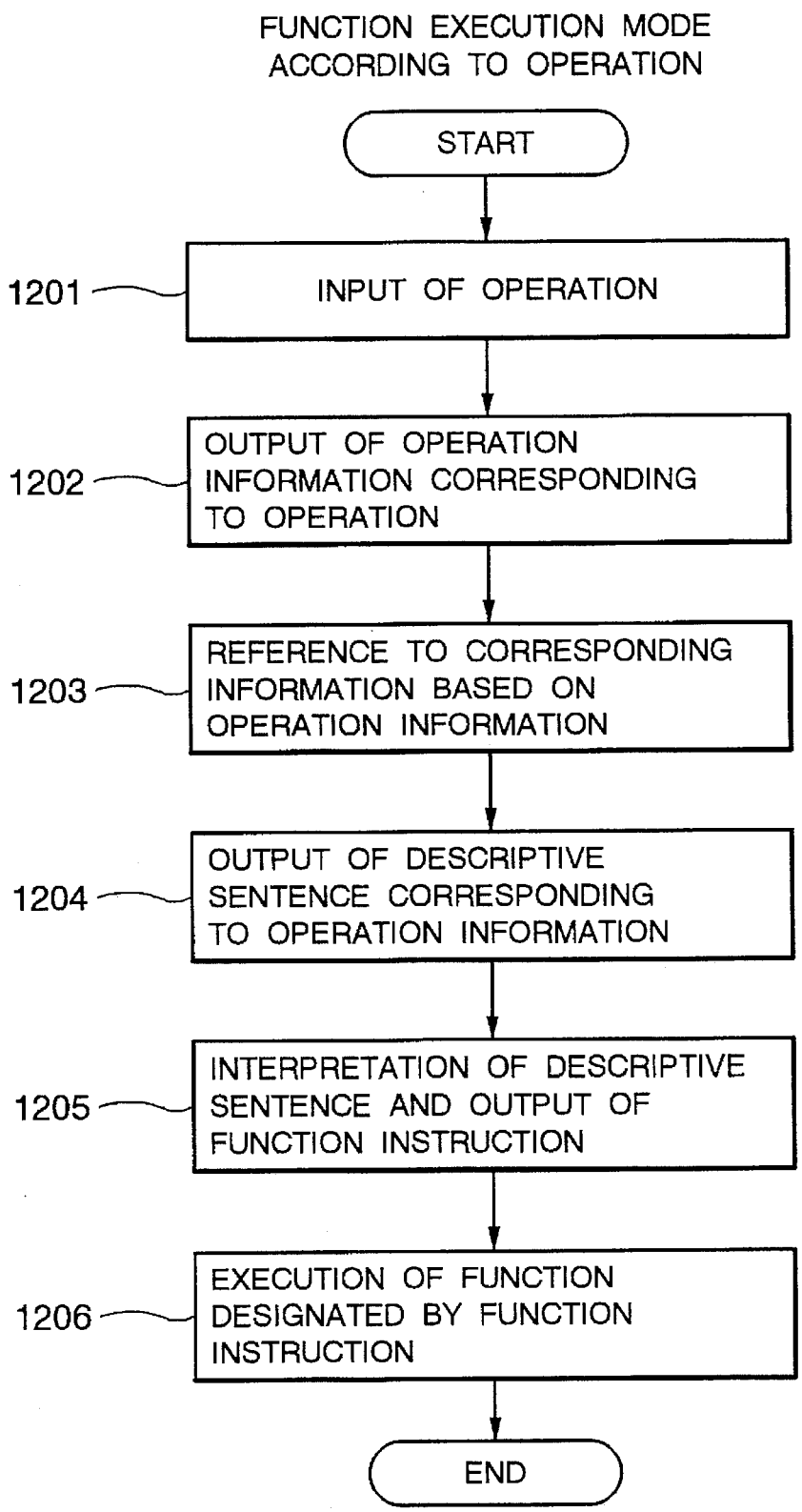

DEFINITION EXECUTION SYSTEM FOR OPERATIONS AND FUNCTIONS IN COMPUTER SYSTEM

BACKGROUNDS OF THE INVENTION

1. Field of the Invention

This invention relates to a definition execution system for operations and functions in a computer system, and particularly to a definition. execution system for operations and functions, which enables to freely define the associating between functions of an application program system and operations for executing the functions using a natural language.

2. Description of the Related Art

In a conventional computer system which runs certain application programs, it is general that the relation between each operation for instructing the application program to execute and an function corresponding to the operation is predetermined fixedly. For example, a correspondence between an operation by inputting a command name provided by the operating system of a computer system or by selecting an icon by means of a pointing device and a function executed by the above operation is fixedly defined in the system, and a user is not allowed to change the correspondence between the operation and the function on the application program. Therefore, such a computer system requires a user to learn and get accustomed to the preprogrammed correspondence between the operation and the function.

A system enabling to expand the correspondence between operations and functions by programming has been proposed in "Visual programming system description model" by Motoji Kato, et al., (Information Processing Society of Japan, Seminar Report 91-SE-78-3). This paper discloses a method to define the associating between execution of a certain function and an operation such as pressing a button or selecting a menu by using a dedicated artificial language in a user interface management system such as window manager in multi-window environment on UNIX.

In the above system which enables to expand the correspondence between the operations and the functions by programming the artificial language, however, it is necessary to learn the dedicated artificial language and the programming language to define the correspondence. And, it has a disadvantage that a user who is not familiar with programming has difficulty in expanding the operations and the functions.

SUMMARY OF THE INVENTION

The first object of the invention is to provide a definition execution system for operations and functions in a computer system, which enables to easily define and expand the associating between the functions of an application program and the operations for executing the function in a natural language.

The second object of the invention is to remedy the necessity of learning a dedicated artificial language and a programming language and to provide a definition execution system for operations and functions, which enables to define the associating between the functions and the operations for executing the functions in a natural language.

According to one aspect of the invention, a definition execution system for operations and functions in a computer system comprising:

a user operation means for accepting an operation by a user with respect to an application program;

a descriptive sentence input means for inputting a descriptive sentence written in a natural language to represent a function corresponding to said operation;

a descriptive sentence interpretation means for interpreting said descriptive sentence to output a function instruction for realizing the function contained in said descriptive sentence represented in a program language of said application program;

a corresponding definition means for associating said operation and said function instruction to output corresponding information which indicates a corresponding relation between said operation and said function instruction;

a corresponding storage means for storing said corresponding information;

a conversion means for entering said operation received by said user operation means to select said function instruction corresponding to said operation according to corresponding information stored in said corresponding storage means; and a function execution means for executing said function according to said function instruction selected.

In the preferred construction, the user operation means has a corresponding table showing a corresponding relation between said operation and operation information showing the operation content by an representation processable in said computer system, and said user operation means, upon accepting the operation by a user, outputs said operation information corresponding to the operation accepted according to said corresponding table.

Also, the corresponding definition means associates said operation information from said user operation means with the function instruction from said descriptive sentence interpretation means to output said corresponding information, and said conversion means selects said function instruction according to the corresponding information stored in said corresponding storage means in view of said operation information from said user operation means.

In the preferred construction, the definition execution system for operations and functions in a computer system comprises a definition mode of the function to the operation and an execution mode of the function to the operation, in the definition mode of the function to the operation:
said user operation means accepts said operation to output to said corresponding definition means, said descriptive sentence in the natural language representing a function corresponding to said operation entered by a descriptive sentence input means is outputted to said descriptive sentence interpretation means.

said function instruction obtained by interpreting said descriptive sentence by said descriptive sentence interpreting means is outputted to said corresponding definition means, and said corresponding definition means outputs corresponding information showing a corresponding relation between said operation and said function instruction to store in said corresponding storage means, in the execution mode of the function to the operation:
said user operation means accepts said operation to output to said conversion means, said conversion means selectively outputs said function instruction corresponding to said operation according to the corresponding information stored in said corresponding storage means, and said function execution means executes said function according to said function instruction.

Also, the descriptive sentence interpretation means comprises:

a syntax interpretation means for outputting a concept dependent representation which corresponds to said descriptive sentence written in the natural language, an domain specific processing means for associating a meaning specified by the concept contained in said concept dependent representation to determine a task to be executed by the computer system and to output as a task representation, and an object language generating means for converting the task determined by said domain specific processing means to the program language of the computer system to output as said function instruction.

According to another aspect of the invention, a definition execution method for operations and functions in a computer system comprising:

a step for accepting the operation by a user with respect to an application program;

a step for inputting a descriptive sentence written in a natural language to represent a function corresponding to said operation;

a step for interpreting said descriptive sentence to output a function instruction for realizing the function contained in said descriptive sentence represented in a program language of said application program;

a step for associating said operation and said function instruction to output and to store corresponding information indicating a corresponding relation between said operation and said function instruction;

a step for entering said operation to select said function instruction corresponding to said operation according to said corresponding information; and a step for executing said function according to said function instruction selected.

In the preferred construction, the definition execution method for operations and functions in a computer system comprises a definition mode of the function to the operation and an execution mode of the function to the operation, in the definition mode of the function to the operation:
said operation is accepted,
said descriptive sentence in the natural language representing a function corresponding to said operation entered is entered,
said function instruction obtained by interpreting said descriptive sentence is outputted, and
said corresponding information showing a corresponding relation between said operation and said function instruction is outputted and stored;

in the execution mode of the function to the operation:
said operation is accepted,
said function instruction corresponding to said operation according to said corresponding information is selectively outputted, and
said function is executed according to said function instruction.

According to another aspect of the invention, a definition execution system for operations and functions in a computer system comprising:

a user operation means for accepting the operation by a user with respect to an application program;

a descriptive sentence input means for inputting a descriptive sentence written in a natural language to represent a function corresponding to said operation;

a corresponding definition means for associating said operation and said descriptive sentence to output corresponding information which indicates a corresponding relation between said operation and said descriptive sentence;

a corresponding storage means for storing said corresponding information;

a conversion means for entering said operation received by said user operation means to select said descriptive sentence corresponding to said operation according to corresponding information stored in said corresponding storage means;

a descriptive sentence interpretation means for interpreting said descriptive sentence to output a function instruction for realizing the function contained in said descriptive sentence represented in a program language of said application program; and a function execution means for executing said function according to said function instruction.

In the above-mentioned construction, the user operation means has a corresponding table showing a corresponding relation between said operation and operation information showing the operation content by an representation processable in said computer system, and said user operation means, upon accepting the operation by a user, outputs said operation information corresponding to the operation accepted according to said corresponding table.

Also, the corresponding definition means associates said operation information from said user operation means with said descriptive sentence from said descriptive sentence input means to output said corresponding information, and said conversion means selects said descriptive sentence according to said corresponding information stored in said corresponding storage means in view of said operation information from said user operation means.

In the above-mentioned construction, the definition execution system for operations and functions in a computer system comprises a definition mode of the function to the operation and an execution mode of the function to the operation, wherein in the definition mode of the function to the operation:
said user operation means accepts said operation to output to said corresponding definition means,
said descriptive sentence in the natural language representing a function corresponding to said operation entered by a descriptive sentence input means is outputted to said corresponding definition means, and
said corresponding definition means outputs corresponding information showing a corresponding relation between said operation and said descriptive sentence to store in said corresponding storage means;

in the execution mode of the function to the operation:
said user operation means accepts said operation to output to said conversion means,
said conversion means selectively outputs said descriptive sentence corresponding to said operation according to the corresponding information stored in said corresponding storage means,
said function instruction obtained by interpreting said descriptive sentence by said descriptive sentence interpreting means is outputted to said corresponding definition means, and said function execution means executes said function according to said function instruction.

Also, the descriptive sentence interpretation means comprises:

a syntax interpretation means for outputting a concept dependent representation corresponding to said descriptive sentence written in the natural language, an domain specific processing means for associating a meaning specified by the concept contained in said concept dependent representation to determine a task to be executed by the computer system and to output as a task representation, and an object language generating means for converting the task determined by said domain specific processing means to the program language of the computer system to output as said function instruction.

According to a further aspect of the invention, a definition execution method for operations and functions in a computer system comprising:

a step for accepting the operation by a user with respect to an application program;

a step for inputting a descriptive sentence written in a natural language to represent a function corresponding to said operation;

a step for associating said operation and said descriptive sentence to output and to store corresponding information indicating a corresponding relation between said operation and said descriptive sentence;

a step for entering said operation to select said descriptive sentence corresponding to said operation according to said corresponding information;

a step for interpreting said descriptive sentence to output a function instruction for realizing the function contained in said descriptive sentence represented in a program language of said application program; and a step for executing said function according to said function instruction selected.

In the above-mentioned construction, the definition execution method for operations and functions in a computer system comprises a definition mode of the function to the operation and an execution mode of the function to the operation, in the definition mode of the function to the operation:
said operation is accepted,
said descriptive sentence in the natural language representing a function corresponding to said operation entered is entered, and
said corresponding information showing a corresponding relation between said operation and said descriptive sentence is outputted and stored; and in the execution mode of the function to the operation:
said operation is accepted,
said descriptive sentence corresponding to said operation according to said corresponding information is selectively outputted,
said function instruction obtained by interpreting said descriptive sentence is outputted, and
said function is executed according to said function instruction.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is a diagram showing content examples of an operation-operation information corresponding table to show the relation between operations and operation information.

FIG. 3 is a diagram showing an example of corresponding information between operation information and a function instruction in the first embodiment.

FIG. 4 is a diagram showing content examples of a corresponding storage portion for storing the corresponding information of the first embodiment.

FIG. 9 is a diagram showing an example of corresponding information between operation information and a descriptive sentence in the second embodiment.

FIG. 10 is a diagram showing content examples of a corresponding storage portion for storing the corresponding information of the second embodiment.

FIG. 12 is a flowchart explaining a process in the execution mode of a function according to the operation by the second embodiment.

DESCRIPTION OF THE PREFERRED EMBODIMENTS

Figure 1:
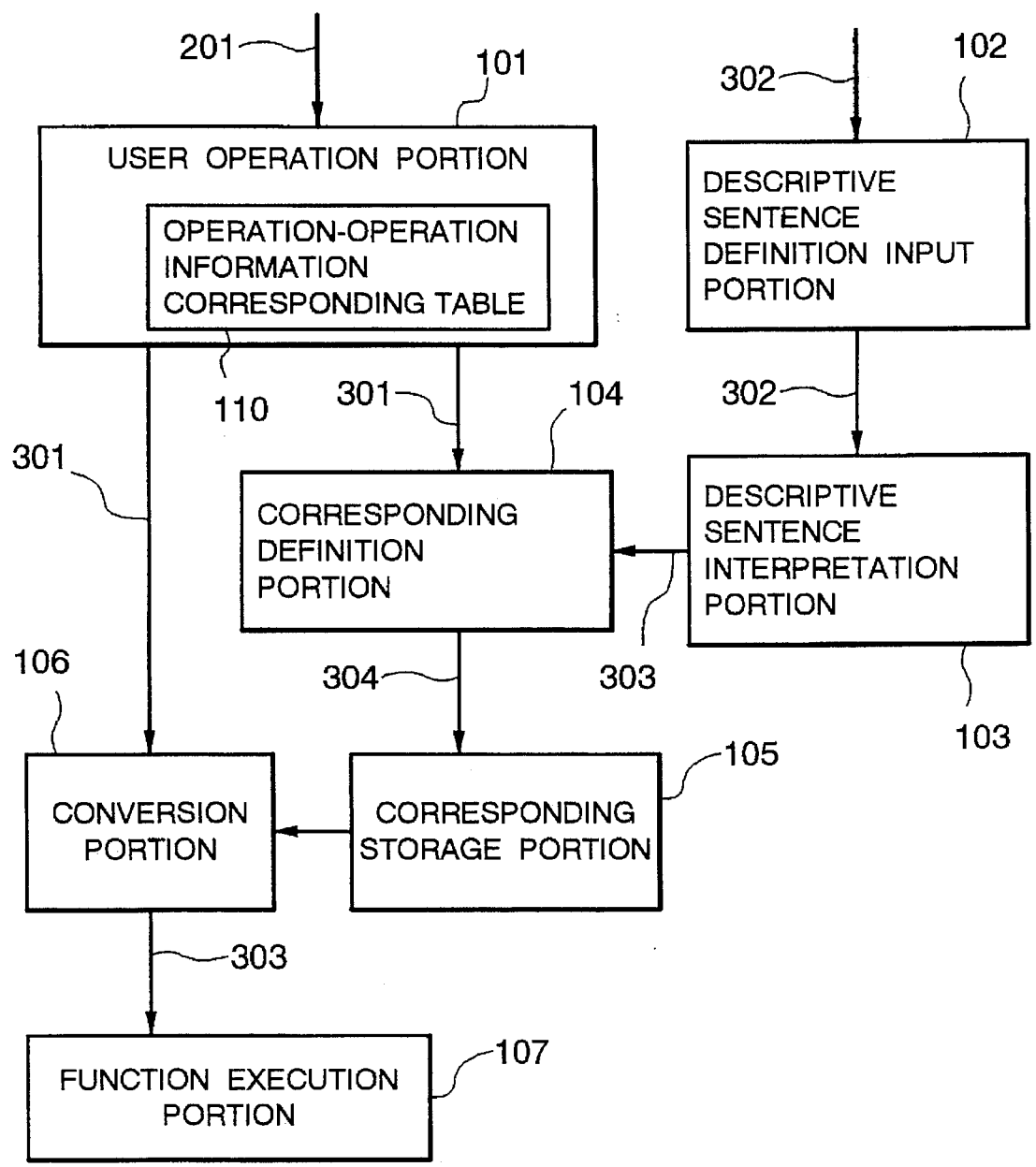
FIG. 1 is a block diagram showing a configuration of the definition execution system for operations and functions in the first embodiment of the invention.

Embodiments of the definition execution system for operations and functions in a computer system of the invention will be described with reference to the attached drawings. FIG. 1 is a block diagram showing a configuration of the definition execution system for operations and functions in the first embodiment of the invention. This definition execution system for operations and functions is a system allowing a user to freely define the correspondence between a function realized by an application program and an operation for executing the above function on an application program which operates on a computer system. The definition execution system for operations and functions can be provided, for example, as an expansion feature of the application program.

The definition execution system for operations and functions of the first embodiment consists of a user operation portion 101 for accepting an operation by a user, a conversion portion 106 for converting the operation to its aimed function instruction, a function execution portion 107 for executing the function according to the function instruction, a descriptive sentence input portion 102 for inputting a descriptive sentence of the function corresponding to the operation in a natural language, a descriptive sentence interpretation portion 103 for interpreting the entered descriptive sentence written in the natural language to output a function instruction, a corresponding definition generation portion 104 for associating the operation and the function, and a corresponding storage portion 105 for storing the corresponding relation between the operation and the function as data.

The user operation portion 101 enters the operation for instructing the function execution to an application program. The user operation portion 101 consists of a graphical user interface for providing a visual programming environment or visual operation environment for example, and operates to select or move an icon shown on a display by a pointing device such as a mouse. The user operation portion 101 is not limited to the above graphical user interface, but may consist of an interface which for example operates by directly entering a command on the display.

The user operation portion 101 is provided with an operation-operation information corresponding table 110. The operation-operation information corresponding table 110 has previously registered data showing a corresponding relation between an operation 201 entered from the user operation portion 101 and operation information 301 showing the operation content by an internally processable representation. Types of operation registered in the operation-operation information corresponding table 110 are different depending on each application program.

The descriptive sentence input portion 102 enters in a natural language a descriptive sentence indicating the content of a function corresponding to the operation by the user operation portion 101.

The descriptive sentence interpretation portion 103 interprets the descriptive sentence written in the natural language entered from the descriptive sentence input portion 102 to output as the function instruction by the program language (application program language) of the computer system. According to the function instruction, the application program or the function of the operating system is executed.

The corresponding definition generation portion 104 associates the operation information from the user operation portion 101 with the function instruction from the descriptive sentence interpretation portion 103 to store as data the corresponding relation in the corresponding storage portion 105.

The conversion portion 106 converts the entered operation to a corresponding function instruction and outputs in the function executing stage by the operation. The function execution portion 107 executes the application program or the function of the operating system according to the function instruction sent from the conversion portion 106.

The definition execution system for operations and functions in this embodiment is provided with a mode for defining functions corresponding to operations and a mode for executing functions according to the corresponding relation defined by the operations.

Figure 6:
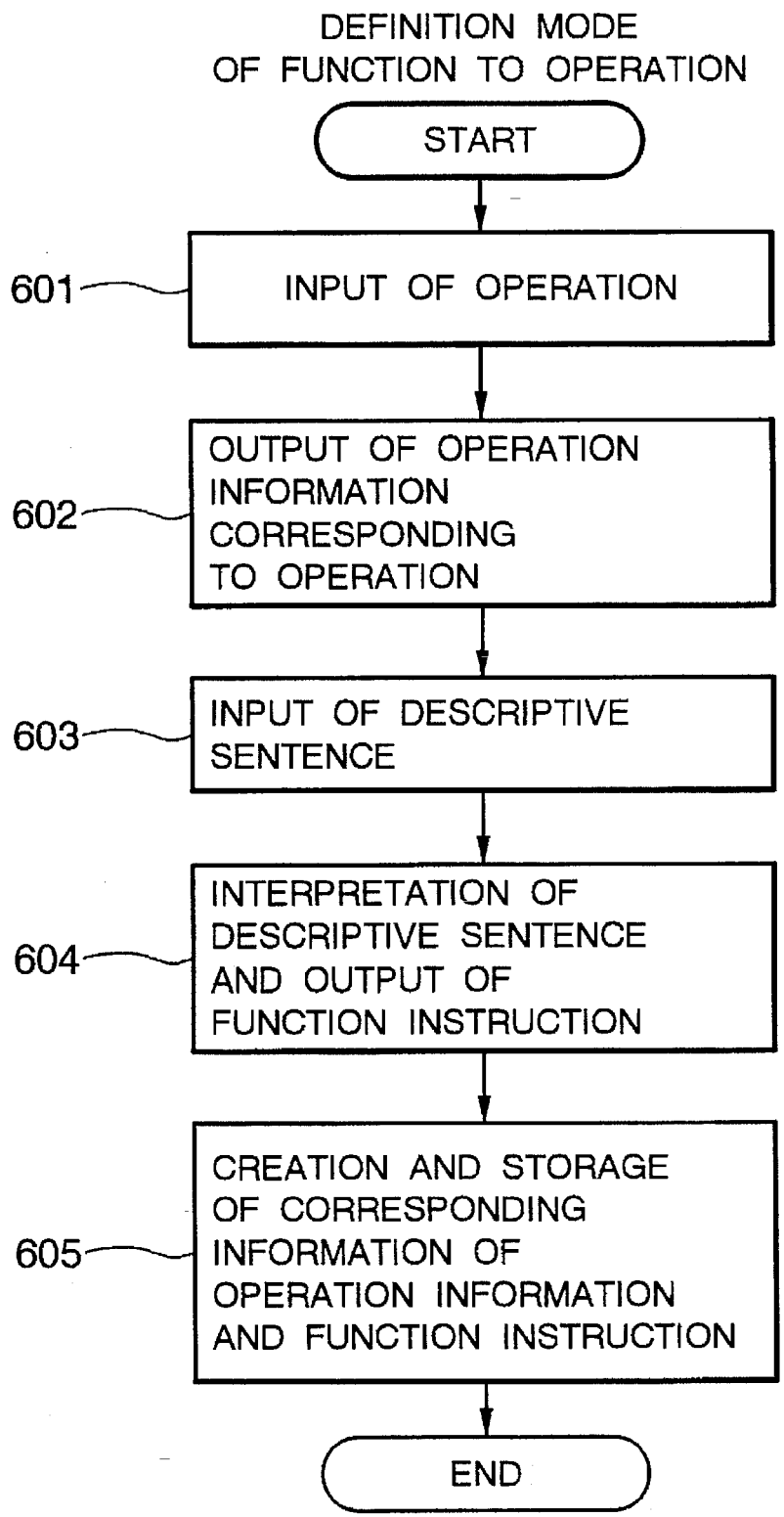
FIG. 6 is a flowchart explaining a process in the definition mode of a function corresponding to the operation by the first embodiment.

First, the mode for defining functions corresponding to operations will be described. FIG. 6 is a flowchart for explaining the flow of a process for defining functions corresponding to operations. When a user conducts an operation 201 by means of the user operation portion 101 (step 601), operation information 301, which expresses the operation 201 entered according to the operation-operation information corresponding table 110 in an internally processable representation, is outputted from the user operation portion 101 (step 602).

For example, to define a function for selecting an icon in visual programming, when the operation 201 is conducted to select icon #1, the user operation portion 101 outputs the operation information 301 named "select icon #1" according to the operation-operation information corresponding table 110 shown in FIG. 3.

At the same time, when the user enters a descriptive sentence 302 which describes a function corresponding to an operation 900 in a natural language from the descriptive sentence input portion 102 (step 603), the descriptive sentence input portion 102 outputs the entered descriptive sentence 302 to the descriptive sentence interpretation portion 103. The descriptive sentence interpretation portion 103 interprets the entered descriptive sentence 302 and outputs a function instruction 303 expressed in the program language (application program language) of the computer system (step 604).

The flowchart of FIG. 6 shows the flow of a process for entering the descriptive sentence 302 and outputting the function instruction by the descriptive sentence input portion 102 after the operation entry and the output of the operation information by the user operation portion 101. But, it is possible to simultaneously effect the operation entry and the output of the operation information by the user operation portion 101 and the entry of the descriptive sentence 302 and the output of the function instruction by the descriptive sentence input portion 102.

Figure 5:
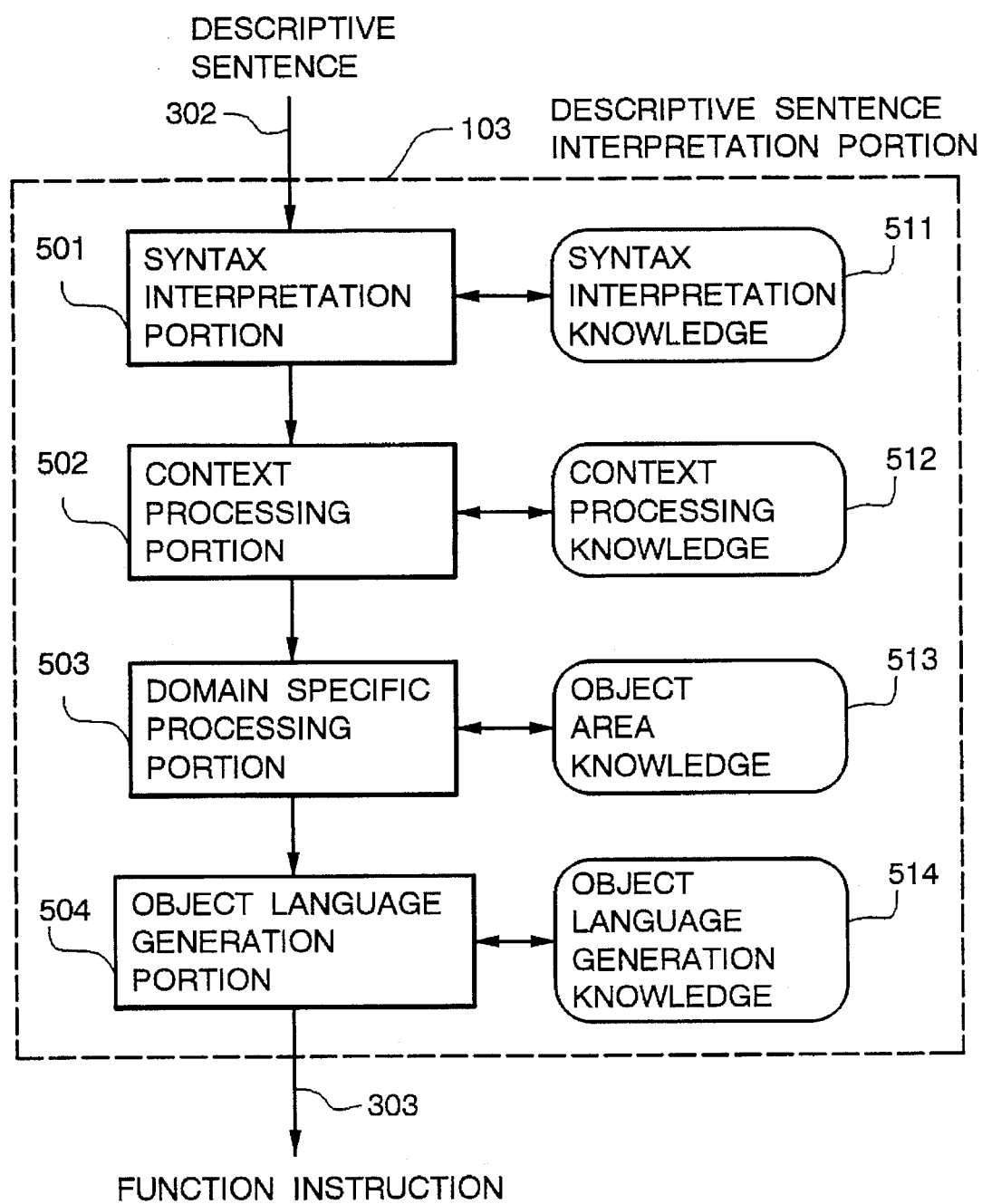
FIG. 5 is a block diagram showing a configuration example of a descriptive sentence interpreting portion of the first embodiment.

The descriptive sentence interpretation portion 103 can be realized by for example "Natural language interface method" disclosed in Japanese Patent Application Laid-open Print No. 6-195392 filed by the applicant for this invention. FIG. 5 is a block diagram showing a configuration example of the descriptive sentence interpreting portion 103. In FIG. 5, a syntax interpretation portion 501 refers to a syntax interpretation knowledge 511 to output a concept dependent representation 532 corresponding to the descriptive sentence 302 written in the natural language. The concept dependent representation 532 replaces a concept contained in the descriptive sentence by a concept used on the application program, and clarifies the relation among a plurality of concepts contained in the descriptive sentence. When the descriptive sentence 302 "the document is drawn up" is entered, if the application program does not have a concept which agrees with the concept "is drawn up", the syntax interpretation portion 501 extracts "edits" as a concept closest to the "is drawn up" in view of the concept to be used on the application program to make the concept dependent representation 532. This concept dependent representation 532 may include a demonstrative noun such as "that" or may have a previously entered content omitted.

A context processing portion 502 decides the correspondence of a demonstrative noun contained in the concept dependent representation 532 or complements the omission based on the context according to a context processing knowledge 512 to output a concept dependent representation 533.

An domain specific processing portion 503 associates a meaning specified by the concept contained in the concept dependent representation 533 based on an object area knowledge 513 to determine a task to be executed by the computer system, and outputs as a task representation 534. For example, when the concept dependent representation 533 "the document is edited" is entered, a task "editing" executable by the computer system is decided from the concept "is edited". And, in view of the concept "document", meaning is given as its task's editing object. For example, when a document name "draft" is set as a default to correspond to the "document", a task representation 534 "the document 'draft' is edited" is outputted.

An object language generating portion 504 converts the task decided by the domain specific processing portion 503 to the program language (application program language) of the computer system based on an object language executing knowledge 514, and outputs as the function instruction 303. For example, when the task representation 534 which indicates to edit the document "draft" is outputted from the domain specific processing portion 503 with respect to the descriptive sentence 302 "the document is drawn up", a function instruction 303 "ed draft" is outputted if a program language corresponding to the "edit" is "ed".

As described above, when the sentence "the document is drawn up" is entered as a descriptive sentence 302 for example, the descriptive sentence interpreting portion 103 outputs as an interpreted result of the descriptive sentence 302 the "ed draft" as the function instruction 303.

The corresponding definition generation portion 104 regards the operation information 301 and the function instruction 303 as input, associate them with each other, and stores corresponding information 304 which shows the corresponding relation between the operation information 301 and the function instruction 303 into the corresponding storage portion 105 (step 605). FIG. 4 shows an example of the corresponding information 304 to be stored in the corresponding storage portion 105 by the corresponding definition portion 104 when "select icon #1" is entered as the operation information 301 and "ed draft" as the function instruction 303. FIG. 5 shows a content example of the corresponding storage portion 105 which stores a plurality of corresponding information 304 including the corresponding information of the operation information "select icon #1" and the function instruction "ed draft".

Thus, the corresponding relation of the function to be realized by the application program and the operation for executing the above function is defined. To successively define the correspondence of another function and another operation, the process from step 601 is repeated.

Figure 7:
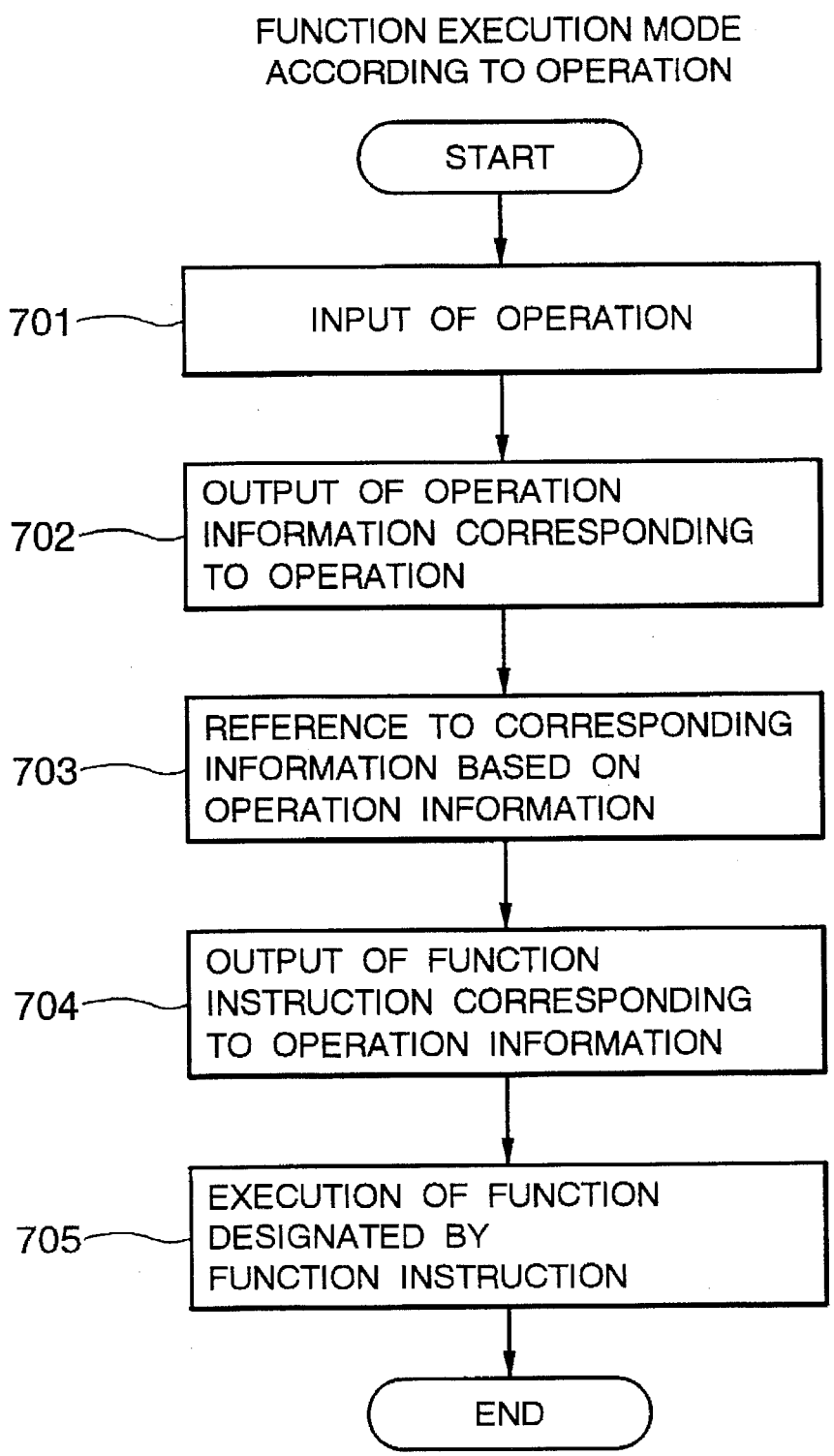
FIG. 7 is a flowchart explaining a process in the execution mode of a function according to the operation by the first embodiment.

Second, the process of a mode for executing a function by an operation will be described. FIG. 7 is a flowchart explaining the flow of a process in executing the function according to the operation.

To execute the function by the operation, when a user enters the operation 201 from the user operation portion 101 (step 701), operation information 301 corresponding to the entered operation 201 is outputted to the conversion portion 106 (step 702). For example, an operation to select icon #1 outputs operation information 301 represented by a symbol "select icon #1".

The conversion portion 106 regards the operation information 301 as input, refers to the corresponding information 304 of the corresponding storage portion 105 (step 703), and selects a function instruction 303 corresponding to the operation information 301 to output (step 704). For example, when "select icon #1" is entered as the operation information 301, "ed draft" is selectively outputted as the function instruction 303 corresponding to the operation information 301 "select icon #1" based on the corresponding information 304 which is contained in the corresponding storage portion 105.

The function execution portion 107 regards the function instruction 303 as input, and executes the application program designated by the function instruction 303 or the function of the operating system (step 705). For example, when "ed draft" is entered as the function instruction 304, an editor is activated by a command "ed" with respect to the document having a document name "draft".

Figure 8:
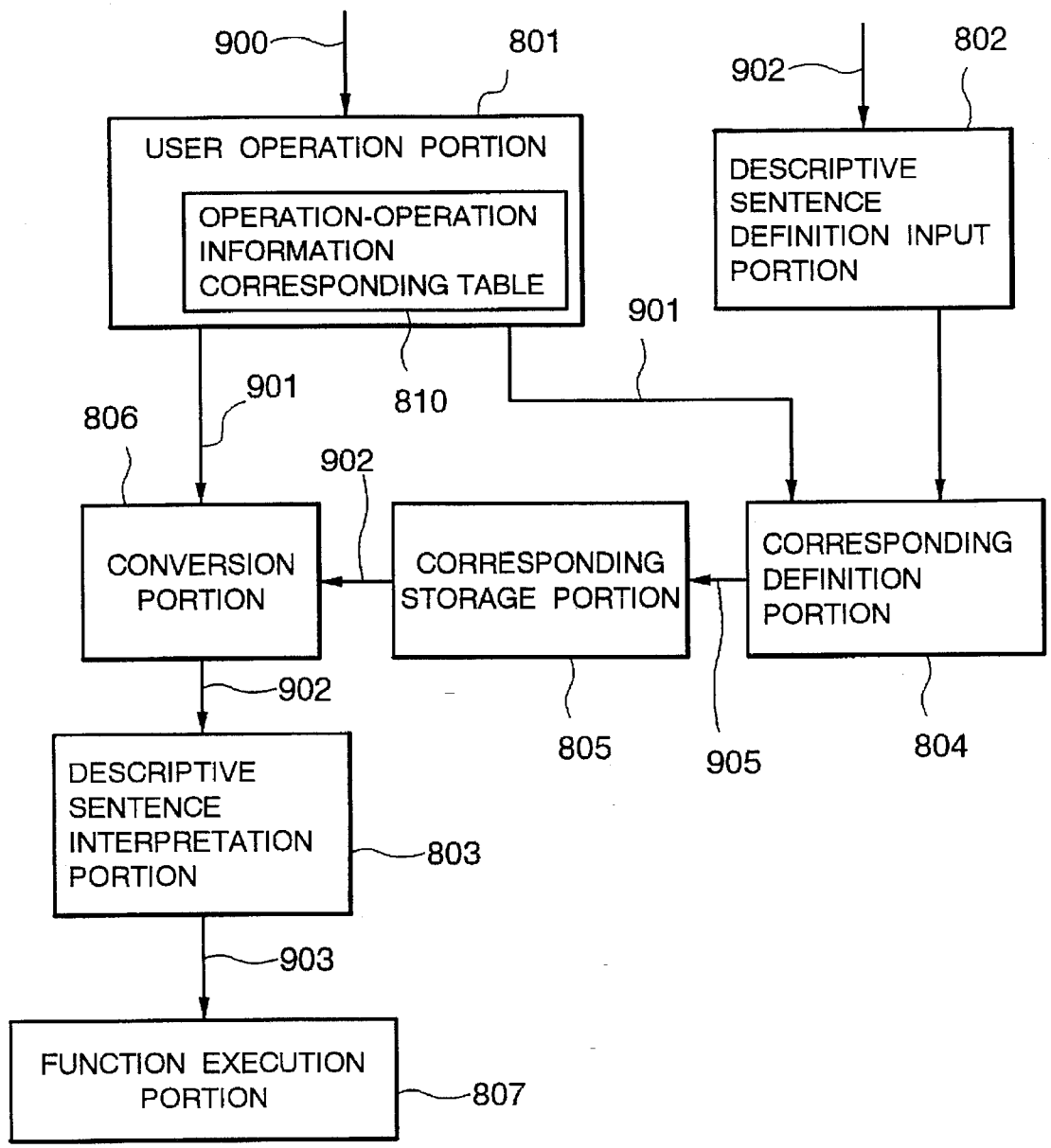
FIG. 8 is a block diagram showing a configuration of the definition execution system for operations and functions in the second embodiment of the invention.

FIG. 8 is a block diagram showing a configuration of the definition execution system for the operation and the function in the second embodiment of the invention.

The definition execution system of the second embodiment consists of a user operation portion 801 for accepting the operation by a user, a conversion portion 806 for converting the operation to a descriptive sentence written in a natural language of a function aimed at by the operation, a descriptive sentence interpretation portion 803 for interpreting the descriptive sentence to output a function instruction, a function execution portion 807 for executing a function according to the function instruction, a descriptive sentence definition portion 802 for inputting a descriptive sentence of the function corresponding to the operation in a natural language, a corresponding definition generation portion 804 for associating the operation effected by the user and the descriptive sentence of the function aimed at by the operation, and a corresponding information storage portion 805 for storing the corresponding relation between the operation and the function.

The user operation portion 801 is provided with the same features as the user operation portion 101 of the first embodiment shown in FIG. 1. Namely, the user operation portion 801 enters the operation for instructing to execute the function with respect to an application program by a graphical user interface. The user operation portion 801 is provided with an operation-operation information corresponding table 810. The operation-operation information corresponding table 810 has previously registered data showing the corresponding relation between operation 900 entered from the user operation portion 801 and operation information 901 showing the operation content by an internally processable representation in the same way as the operation-operation information corresponding table 110 of the first embodiment. Types of operation registered in the operation-operation information corresponding table 810 are different depending on each application program.

The descriptive sentence input portion 802 enters in a natural language the descriptive sentence indicating the content of a function corresponding to the operation by the user operation portion 801.

The corresponding definition generation portion 804 associates the operation information 901 from the user operation portion 801 with the descriptive sentence 902 written in the natural language from the descriptive sentence input portion 802 to store the corresponding relation as data in the corresponding storage portion 805.

The conversion portion 806 converts the entered operation information to a corresponding descriptive sentence and outputs in the stage executing the function according to the operation.

The descriptive sentence interpretation portion 803 interprets the descriptive sentence written in the natural language entered from the conversion portion 806 to output as function instruction 903 in the program language (application program language) of the computer system. According to the function instruction, the application program or the function of the operating system is executed.

The function execution portion 807 executes the application program or the function of the operating system according to the function instruction 903 sent from the descriptive sentence interpretation portion 803.

The definition execution system for operations and functions in this embodiment is provided with a mode for defining functions corresponding to operations and a mode for executing the functions according to the corresponding relation defined by the operations.

Figure 11:
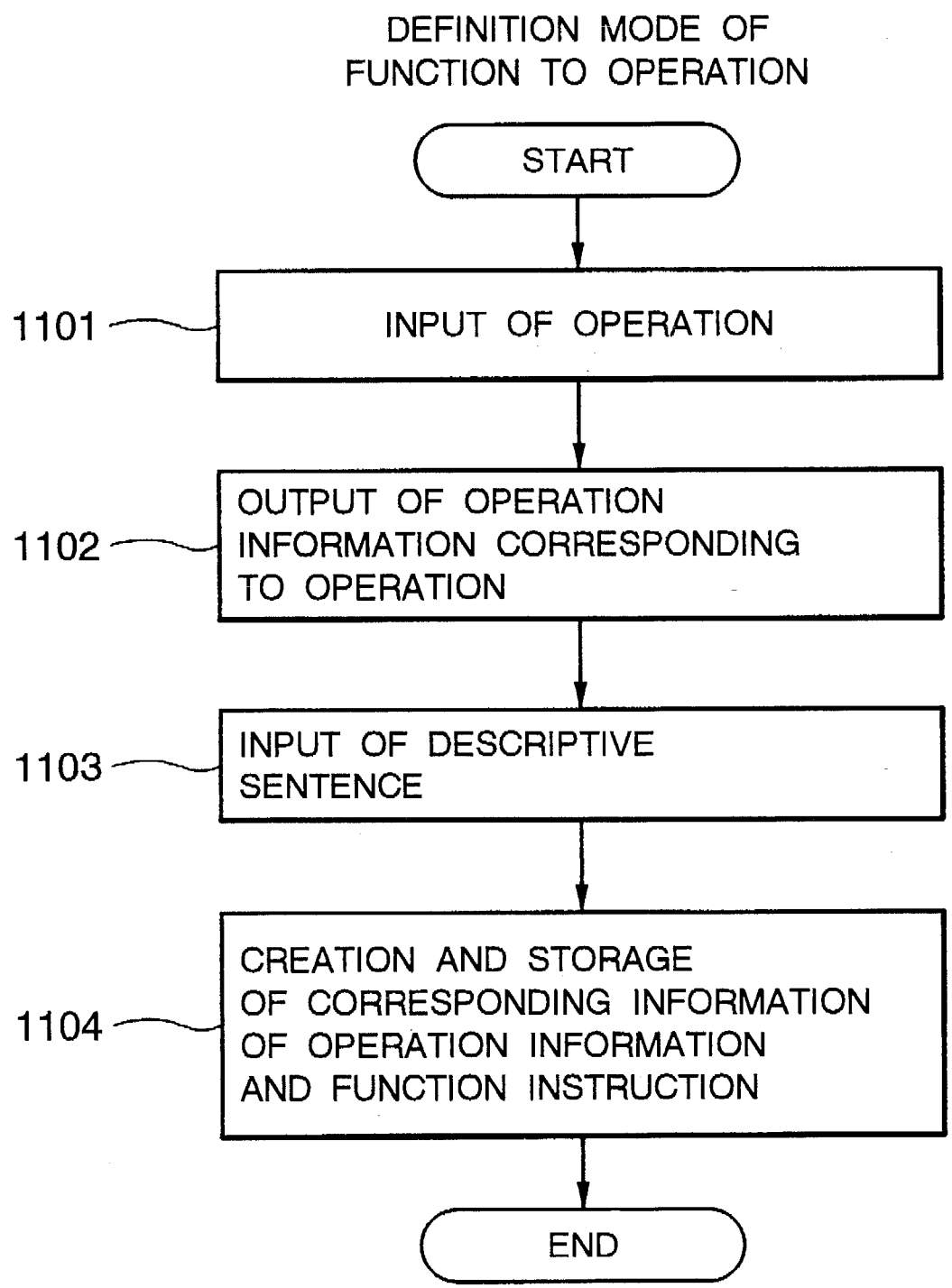
FIG. 11 is a flowchart explaining a process in the definition mode of a function corresponding to the operation in the second embodiment.

First, the mode for defining functions corresponding to operations will be described. FIG. 11 is a flowchart for explaining the flow of a process for defining functions corresponding to operations. When a user conducts an operation 900 by means of the user operation portion 801 (step 1101), operation information 901, which expresses the operation 900 entered based on the operation-operation information corresponding table 810 in an internally processable representation, is outputted from the user operation portion 801 (step 1102).

For example, to define a function for selecting an icon in visual programming, when the operation 900 is conducted to select icon #1, the user operation portion 801 outputs the operation information 901 named "select icon #1" based on the operation-operation information corresponding table 810 shown in FIG. 3.

At the same time, when the user enters a descriptive sentence 902 which describes a function corresponding to an operation in a natural language from the descriptive sentence input portion 802 (step 1103), the descriptive sentence input portion 802 outputs the descriptive sentence 902 entered by the user to the corresponding definition generation portion 804.

The flowchart of FIG. 11 shows the flow of a process for entering the descriptive sentence 902 by the descriptive sentence input portion 802 after the operation entry and the output of the operation information by the user operation portion 801. But, it is possible to simultaneously effect the operation entry and the output of the operation information by the user operation portion 801 and the entry of the descriptive sentence 902 by the descriptive sentence input portion 802.

The corresponding definition generation portion 804 regards the operation information 901 and the descriptive sentence 902 as input, associates them with each other, and stores corresponding information 905 which shows the corresponding relation between the operation information 901 and the descriptive sentence 902 into the corresponding storage portion 805 (step 1104). FIG. 9 shows an example of the corresponding information 905 where "select icon #1" is entered as the operation information 301 and "the document is drawn up" is entered as the descriptive sentence 902. FIG. 10 shows a content example of the corresponding storage portion 805 which stores a plurality of corresponding information 905 including the corresponding information of "select icon #1" and the descriptive sentence "the document is drawn up".

Thus, the corresponding relation of the function to be realized by the application program and the operation for executing the above function is defined. To successively define the correspondence of another function and another operation, the process from step 1101 is repeated.

Second, the process of a mode for executing a function according to an operation will be described. FIG. 12 is a flowchart explaining the flow of a process in executing the function according to the operation.

To execute the function according to the operation, when a user conducts the operation 900 from the user operation portion 801 (step 1201), operation information 901 corresponding to the operation 900 is outputted to the conversion portion 806 (step 1202). For example, an operation to select icon #1 outputs operation information 901 represented by "select icon #1".

The conversion portion 806 regards the operation information 901 as input, refers to the corresponding information 905 of the corresponding storage portion 805 (step 1203), and selects the descriptive sentence 902 corresponding to the operation information 901 to output (step 1204). For example, when "select icon #1" is entered as the operation information 901, a descriptive sentence "the document is drawn up" corresponding to "select icon #1" is selectively outputted according to the corresponding information 905 of the corresponding storage portion 805.

The descriptive sentence interpretation portion 803 regards the descriptive sentence 902 outputted by the conversion portion 806 as input, interprets the descriptive sentence 902, and outputs the function instruction 903 expressed in the program language (application program language) of the computer system (step 1205). For example, when a sentence "the document is drawn up" is entered as the descriptive sentence 902, the function instruction 903 "ed draft" is outputted as a result of interpreting the descriptive sentence.

The configuration and operation of the descriptive sentence interpretation portion 803 are same as those of the aforementioned descriptive sentence interpretation portion 103.

The function execution portion 807 regards the function instruction 903 as input, and executes the application program designated by the function instruction 903 or the function of the operating system (step 1206). For example, when "ed draft" is entered as the function instruction 903, an editor is activated by a command "ed" with respect to the document having a document name "draft".

The above description has been made on examples of simple operations of selecting an icon with the user operation portion 101, 801 regarded as a graphical user interface for providing a visual programming environment. Besides, a function corresponding to an operation which combines simple operations such as overlapping and moving icons may be defined. And, corresponding functions may be series of multiple processes such as totalization and preparation of slips of totalized results.

And, the user operation portion 101, 801 may be provided with a voice recognition means and an image recognition means so that operations indicated by voices or gestures are included in the invention.

This invention allows to easily define extensively the corresponding relation between operations and functions in a natural language without requiring to learn a dedicated artificial language or programming language.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A definition execution system for operations and functions in a computer system comprising:

a user operation means for accepting an operation by a user with respect to an application program;

a descriptive sentence input means for inputting a descriptive sentence written in a natural language to represent a function corresponding to said operation;

a descriptive sentence interpretation means for interpreting said descriptive sentence to output a function instruction for realizing the function contained in said descriptive sentence represented in a program language of said application program;

a corresponding definition means for associating said operation and said function instruction to output corresponding information which indicates a corresponding relation between said operation and said function instruction;

a corresponding storage means for storing said corresponding information;

a conversion means for entering said operation received by said user operation means to select said function instruction corresponding to said operation according to corresponding information stored in said corresponding storage means; and a function execution means for executing said function according to said function instruction selected.

2. A definition execution system for operations and functions in a computer system as set forth in claim 1, wherein said user operation means has a corresponding table showing a corresponding relation between said operation and operation information showing the operation content by an representation processable in said computer system, and said user operation means, upon accepting the operation by a user, outputs said operation information corresponding to the operation accepted according to said corresponding table.

3. A definition execution system for operations and functions in a computer system as set forth in claim 2, wherein said corresponding definition means associates said operation information from said user operation means with the function instruction from said descriptive sentence interpretation means to output said corresponding information, and said conversion means selects said function instruction according to the corresponding information stored in said corresponding storage means in view of said operation information from said user operation means.

4. A definition execution system for operations and functions in a computer system as set forth in claim 1, further comprising a definition mode of the function to the operation and an execution mode of the function to the operation, wherein in the definition mode of the function to the operation:
said user operation means accepts said operation to output to said corresponding definition means,
said descriptive sentence in the natural language representing a function corresponding to said operation entered by a descriptive sentence input means is outputted to said descriptive sentence interpretation means,
said function instruction obtained by interpreting said descriptive sentence by said descriptive sentence interpreting means is outputted to said corresponding definition means, and
said corresponding definition means outputs corresponding information showing a corresponding relation between said operation and said function instruction to store in said corresponding storage means, in the execution mode of the function to the operation:
said user operation means accepts said operation to output to said conversion means,
said conversion means selectively outputs said function instruction corresponding to said operation according to the corresponding information stored in said corresponding storage means, and
said function execution means executes said function according to said function instruction.

5. A definition execution system for operation and function in a computer system as set forth in claim 1, wherein said descriptive sentence interpretation means comprises:
a syntax interpretation means for outputting a concept dependent representation which corresponds to said descriptive sentence written in the natural language,
an domain specific processing means for associating a meaning specified by the concept contained in said concept dependent representation to determine a task to be executed by the computer system and to output as a task representation, and
an object language generating means for converting the task determined by said domain specific processing means to the program language of the computer system to output as said function instruction.

6. A definition execution method for operations and functions in a computer system comprising:

a step for accepting the operation by a user with respect to an application program;

a step for inputting a descriptive sentence written in a natural language to represent a function corresponding to said operation;

a step for interpreting said descriptive sentence to output a function instruction for realizing the function contained in said descriptive sentence represented in a program language of said application program;

a step for associating said operation and said function instruction to output and to store corresponding information indicating a corresponding relation between said operation and said function instruction;

a step for entering said operation to select said function instruction corresponding to said operation according to said corresponding information; and a step for executing said function according to said function instruction selected.

7. A definition execution method for operations and functions in a computer system according to claim 6 further comprising a definition mode of the function to the operation and an execution mode of the function to the operation, wherein in the definition mode of the function to the operation:
said operation is accepted,
said descriptive sentence in the natural language representing a function corresponding to said operation entered is entered,
said function instruction obtained by interpreting said descriptive sentence is outputted, and
said corresponding information showing a corresponding relation between said operation and said function instruction is outputted and stored;

in the execution mode of the function to the operation:
said operation is accepted,
said function instruction corresponding to said operation according to said corresponding information is selectively outputted, and
said function is executed according to said function instruction.

8. A definition execution system for operations and functions in a computer system comprising:

a user operation means for accepting the operation by a user with respect to an application program;

a descriptive sentence input means for inputting a descriptive sentence written in a natural language to represent a function corresponding to said operation;

a corresponding definition means for associating said operation and said descriptive sentence to output corresponding information which indicates a corresponding relation between said operation and said descriptive sentence;

a corresponding storage means for storing said corresponding information;

a conversion means for entering said operation received by said user operation means to select said descriptive sentence corresponding to said operation according to corresponding information stored in said corresponding storage means;

a descriptive sentence interpretation means for interpreting said descriptive sentence to output a function instruction for realizing the function contained in said descriptive sentence represented in a program language of said application program; and a function execution means for executing said function according to said function instruction.

9. A definition execution system for operations and functions in a computer system as set forth in claim 8, wherein said user operation means has a corresponding table showing a corresponding relation between said operation and operation information showing the operation content by an representation processable in said computer system, and said user operation means, upon accepting the operation by a user, outputs said operation information corresponding to the operation accepted according to said corresponding table.

10. A definition execution system for operations and functions in a computer system as set forth in claim 9, wherein said corresponding definition means associates said operation information from said user operation means with said descriptive sentence from said descriptive sentence input means to output said corresponding information, and said conversion means selects said descriptive sentence according to said corresponding information stored in said corresponding storage means in view of said operation information from said user operation means.

11. A definition execution system for operations and functions in a computer system as set forth in claim 8 further comprising a definition mode of the function to the operation and an execution mode of the function to the operation, wherein in the definition mode of the function to the operation:
said user operation means accepts said operation to output to said corresponding definition means,
said descriptive sentence in the natural language representing a function corresponding to said operation entered by a descriptive sentence input means is outputted to said corresponding definition means, and
said corresponding definition means outputs corresponding information showing a corresponding relation between said operation and said descriptive sentence to store in said corresponding storage means;

in the execution mode of the function to the operation:
said user operation means accepts said operation to output to said conversion means,
said conversion means selectively outputs said descriptive sentence corresponding to said operation according to the corresponding information stored in said corresponding storage means,
said function instruction obtained by interpreting said descriptive sentence by said descriptive sentence interpreting means is outputted to said corresponding definition means, and said function execution means executes said function according to said function instruction.

12. A definition execution system for operations and functions in a computer system as set forth in claim 8, wherein said descriptive sentence interpretation means comprises:
a syntax interpretation means for outputting a concept dependent representation corresponding to said descriptive sentence written in the natural language,
an domain specific processing means for associating a meaning specified by the concept contained in said concept dependent representation to determine a task to be executed by the computer system and to output as a task representation, and
an object language generating means for converting the task determined by said domain specific processing means to the program language of the computer system to output as said function instruction.

13. A definition execution method for operations and functions in a computer system comprising:

a step for accepting the operation by a user with respect to an application program;

a step for inputting a descriptive sentence written in a natural language to represent a function corresponding to said operation;

a step for associating said operation and said descriptive sentence to output and to store corresponding information indicating a corresponding relation between said operation and said descriptive sentence;

a step for entering said operation to select said descriptive sentence corresponding to said operation according to said corresponding information;

a step for interpreting said descriptive sentence to output a function instruction for realizing the function contained in said descriptive sentence represented in a program language of said application program; and a step for executing said function according to said function instruction selected.

14. A definition execution method for operations and functions in a computer system as set forth in claim 13 further comprising a definition mode of the function to the operation and an execution mode of the function to the operation, wherein in the definition mode of the function to the operation:
said operation is accepted,
said descriptive sentence in the natural language representing a function corresponding to said operation entered is entered, and
said corresponding information showing a corresponding relation between said operation and said descriptive sentence is outputted and stored; and in the execution mode of the function to the operation:
said operation is accepted,
said descriptive sentence corresponding to said operation according to said corresponding information is selectively outputted,
said function instruction obtained by interpreting said descriptive sentence is outputted, and
said function is executed according to said function instruction.

* * * * *